United States Patent [19]

Adams

[11] Patent Number: 4,645,026
[45] Date of Patent: Feb. 24, 1987

[54] VEHICLE CONTROL SYSTEM

[75] Inventor: Frederick J. Adams, Clevedon, United Kingdom

[73] Assignee: TRW Cam Gears Limited, Hitchin, Great Britain

[21] Appl. No.: 770,404

[22] Filed: Aug. 28, 1985

[30] Foreign Application Priority Data

Oct. 31, 1984 [GB] United Kingdom ............... 8427617

[51] Int. Cl.$^4$ .................................................. B60T 13/00
[52] U.S. Cl. ............................ 180/132; 180/142; 60/484; 417/286
[58] Field of Search .................. 180/132, 142, 143; 60/484, 486, 418; 417/286, 287, 288

[56] References Cited

U.S. PATENT DOCUMENTS

| | | | |
|---|---|---|---|
| 2,875,843 | 3/1959 | Price | 180/132 |
| 3,170,536 | 2/1965 | Van House et al. | 180/132 |
| 3,640,301 | 2/1972 | Jania | 60/418 |
| 3,785,393 | 1/1974 | Tanguy | 60/418 |
| 4,212,165 | 7/1980 | Zirps | 60/486 |
| 4,317,332 | 3/1982 | Schubert | 60/418 |

*Primary Examiner*—John J. Love
*Assistant Examiner*—Donn McGiehan
*Attorney, Agent, or Firm*—Tarolli, Sundheim & Covell

[57] ABSTRACT

A vehicle control system has a system part 5 with a pump 6 feeding an open centre valve 4 which controls power assistance for vehicle steering. A second system part 11 has a pump 16 feeding an accumulator 13 and a closed centre valve 10 which controls operation of a clutch or brake booster 2. The pumps 6 and 16 are simultaneously driven by a motor 18. A by-pass valve 21 in conduit 20 is responsive through a pressure transducer 22 and an electrical control unit 19 to pressure in the accumulator 13 so that when the accumulator pressure attains a predetermined value the by-pass valve 21 opens communication between the output from pump 16 and a reservoir 7 to relieve the load on the motor 18. A pressure regulating valve 23 is provided in the steering system part 5. The valve 23 is responsive to pressure from the output of the second pump 16 through conduit 28 and permits the output from the pump 6 to flow by way of conduits 24 and 9 to the reservoir 7 when the pressure from the pump 16 attains a predetermined value so that the pressure available to the valve 4 is less than the maximum pressure available from the output of the pump 6 and the load on the motor 18 which is attributable to it driving the pump 6 is relieved. The valve 23 is preferably a spring loaded spool valve displaceable by expansion of a chamber through the admission of fluid from conduit 28.

14 Claims, 2 Drawing Figures

VEHICLE CONTROL SYSTEM

TECHNICAL FIELD AND BACKGROUND ART

This invention relates to a vehicle control system of the kind having an open centre valve which controls operation of the first servo device, a closed centre valve which is fed from an accumulator and controls operation of a second servo device, the accumulator and open centre valve being fed from pump means which may be mechanically or electrically driven. Such a system is likely to be incorporated in a vehicle with the first servo device providing power assistance to a steering gear so that when a steering manoeuvre is not being effected the first valve is in its open centre condition and hydraulic fluid flows unrestrictedly by way of that valve in known manner. The second servo device may provide power assistance to operation of a brake or clutch which, when inoperative, locates the valve in its neutral or closed centre condition to prevent the flow of hydraulic fluid therethrough from the accumulator—again in known manner. With known power systems of this kind the output from the motor driven pump is supplied by way of a distributor to a system part which includes the first servo device and a second system part which includes the second servo device with the consequence that, whenever the accumulator requires charging, the whole of the pump output is raised to the accumulator pressure—Accordingly there may be a considerable wastage of energy in driving the pump motor (this is particularly so for an electrically driven pump where the electrical power drain can be excessive.) There is therefore a requirement for a control system of the kind discussed above which permits efficient utilisation of the energy which is available to supply hydraulic fluid under pressure to the servo devices and it is an object of the present invention to satisfy this requirement.

STATEMENT OF INVENTION AND ADVANTAGES

According to the present invention there is provided a vehicle control system having a first hydraulic system part comprising a first pump the output from which feeds an open centre valve which valve controls operation of a first servo device; a second hydraulic system part comprising a second pump the output from which feeds an accumulator and a closed centre valve which is fed from said accumulator and controls operation of a second servo device; a motor simultaneously driving both said first and second pumps, and pressure control means which is responsive to pressure in the accumulator and which means directs at least part of the output from the second pump to a low pressure sink when said pressure attains a predetermined value to relieve the load on the motor which is attributable to it driving the second pump.

By the proposal of the present invention the first and second pumps, which may have different output flow rates, are incorporated in discrete hydraulic system parts but are driven by a common motor (which is preferably electric.) Upon the hydraulic pressure in the accumulator attaining a predetermined value, the pressure control means reacts to direct at least part, and preferably the whole, of the output from the second pump to the low pressure sink (or reservoir) so that the second pump may be subjected to negligible workload. This relieves the load on the motor so that the available energy can be utilised for driving the first pump.

Preferably the first hydraulic system part includes a regulating means which is responsive to pressure from the output of the second pump and which regulating means permits at least part of the output from the first pump to flow to the low pressure sink or reservoir when the pressure of the output from the second pump attains a predetermined value so that the pressure which is available to the open centre valve means is less than the maximum pressure available from the output of the first pump and the load on the first motor which is attributable to driving the first pump is relieved. By incorporating the aforementioned regulating means in the first system part it is possible for the energy utilised in driving the motor to be directed primarily to the second system part. Consequently, if the hydraulic pressure at the output from the second pump increases due to charging of the accumulator and attains a predetermined value the regulating means responds to direct at least part of the output from the first pump to the reservoir.

In a preferred embodiment the first system part is intended to provide power assistance for vehicle steering while the second system part is intended to provide power assistance for a brake or clutch and within the hydraulic system the second system part takes precedent to ensure that the accumulator is adequately charged (particularly for boosting the braking facilities on the vehicle) while some hydraulic fluid under pressure may still be available for actuating the first servo device to assist in steering (the extent of the fluid pressure available for power assisted steering being determined by the proportion of the output from the first pump which is directed by the regulating means to the low pressure return. In this way the energy supply to the motor driving the two pumps can be utilised efficiently to avoid an excessive power drain at the pumps. The regulating means may be responsive to pressure from the output of the second pump to progressively increase the proportion of the output from the first pump which is permitted to flow to the reservoir as the pressure of the output from the second pump progressively increases from the aforementioned predetermined value.

Bearing in mind the applicability of the present invention to power steering systems (where greater assistance is generally required for steering manoeuvres when the vehicle is at low speed than when the vehicle is travelling at high speed) it is preferred that the motor for the pumps is responsive to vehicle speed in an inverse relationship so that as the vehicle speed increases the motor drives the first and second pumps to decrease the output therefrom. With an electric motor the aforementioned inverse relationship can readily be achieved by use of an electric control unit which is responsive to a vehicle speed sensor as will be apparent to persons skilled in the art. Such a control unit may, in addition or alternatively, serve to respond to pressure in the accumulator and provide an electrical control (for example through a solenoid) to actuate the pressure control means as required. The electrical control unit can also serve as a convenient means for actuating the motor for the pumps in response to a demand for hydraulic pressure from either or both the first and second system parts.

DRAWINGS

One embodiment of a vehicle control system constructed in accordance with the present invention will now be described, by way of example only, with reference to the accompanying illustrative drawings, in which:

FIG. 1 is a schematic illustration of the system, and

FIG. 2 diagrammatically illustrates a regulating means included in the system of FIG. 1.

DETAILED DESCRIPTION OF DRAWINGS

Figure 1:
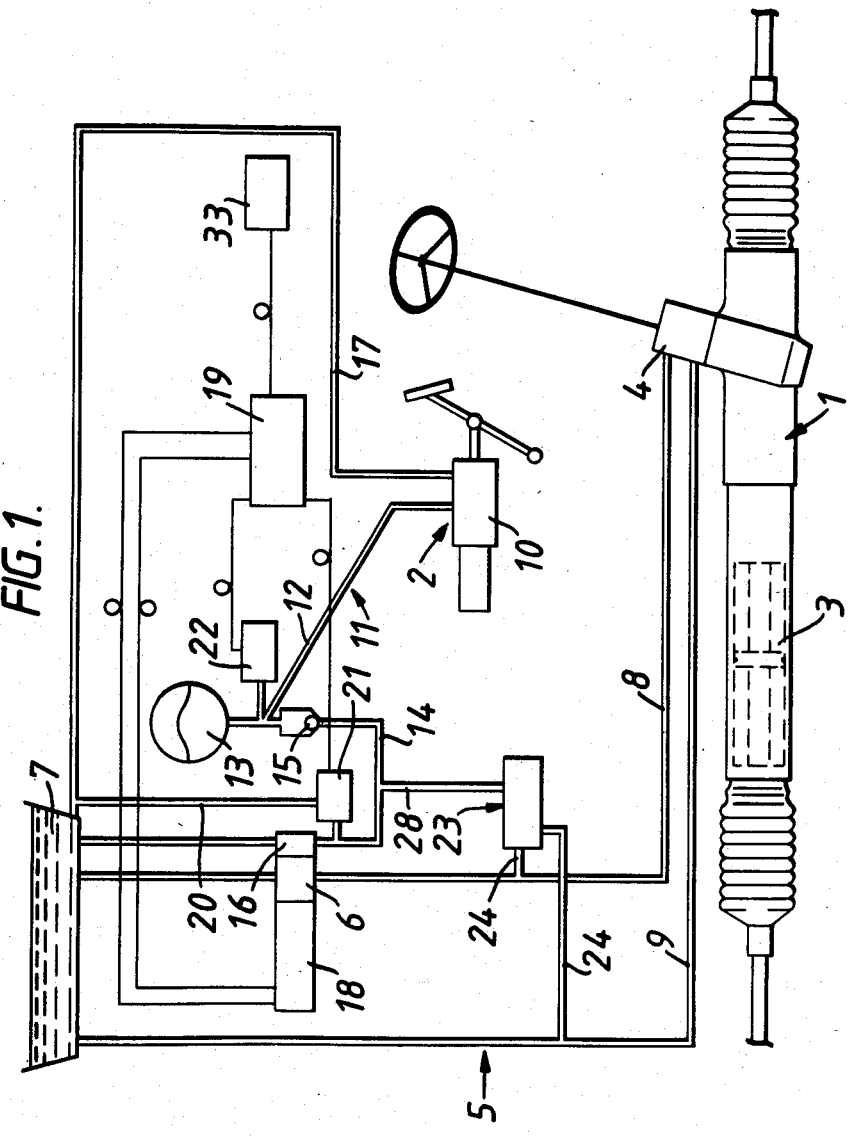

The vehicle control system is for a steering gear 1 and a brake or clutch booster 2. The steering gear 1 is of conventional type, conveniently a rack and pinion, and incorporates a servo device 3 (which may be a double acting piston and cylinder) hydraulic fluid supply to which is controlled by an open centre valve 4—again in conventional manner to provide power assistance to a steering manoeuvre. The open centre valve 4 is incorporated in a first hydraulic system part 5 which has a pump 6 drawing hydraulic fluid from a reservoir 7. The pump 6 feeds the valve 4 by way of a conduit 8 and a conduit 9 provides a return from the valve 4 to the reservoir 7.

The booster 2, which again may be of conventional form, is controlled by a closed centre valve 10 incorporated in a second hydraulic system part 11. Hydraulic fluid under pressure is supplied to the valve 10 by way of a conduit 12 from an accumulator 13 which accumulator is pressurised by way of a conduit 14 and non-return valve 15 from a pump 16 which draws hydraulic fluid from the reservoir 7. A conduit 17 provides a return from the valve 10 to the reservoir 7. The pumps 6 and 16 are simultaneously driven by an electric motor 18 controlled by an electrical unit 19. Connecting between the output from the pump 16 and conduit 14 and the reservoir 7 is a conduit 20 which includes a pressure control means in the form of an open/closed by-pass valve 21. Operation of the valve 21 is electrically controlled by the unit 19, which unit receives an input from a pressure transducer 22 which is responsive to pressure in the accumulator 13.

Figure 2:
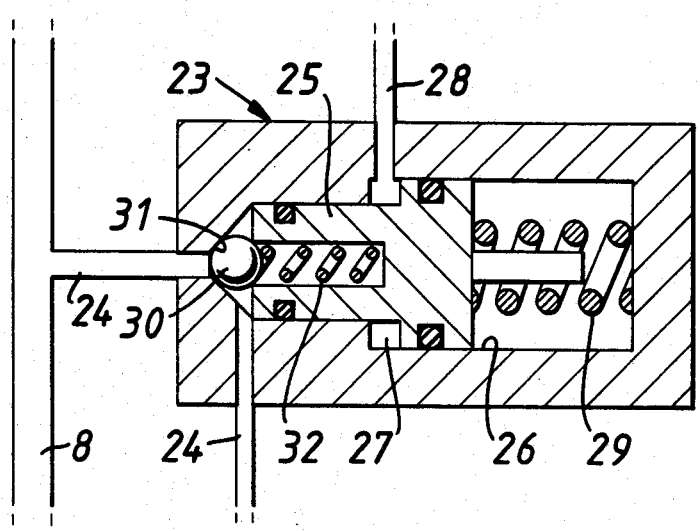

The system part 5 includes a regulating valve 23 (as shown in FIG. 2) which is located in a conduit 24 bridging the conduits 8 and 9. The valve 23 has a stepped spool 25 displaceable in a stepped cylinder 26 to form an expandable annular chamber 27 between the shoulder of the spool and that of the stepped cylinder. The chamber 27 is in constant communication through a conduit 28 with the conduit 14 and thereby with the output from the pump 16. The spool 25 is biased in the cylinder 26 by a spring 29 in a sense to contract the chamber 27. The end of the spool 25 remote from the spring 29 engages with a ball valve 30 which, under the biasing action of the spring 29 is normally urged by the spool 25 into a seating 31 to close the conduit 24. In addition the ball 30 is biased by a spring 32 relative to the spool 25 and in a sense to urge the ball 30 into its seating 31. As expected, the biasing force exerted by the spring 32 is less than that exerted by the spring 29.

In use of the system and with the electric motor 18 driving pumps 6 and 16, fluid circulates unrestrictedly through the system part 5 when the valve 4 is in its open centre condition. It may be assumed that the regulating valve 23 is in the condition shown in FIG. 2 to close the conduit 24, thus in the system part 11 the output from pump 16 serves to charge the accumulator 13 by way of conduit 14 and non-return valve 15. However, when the accumulator 13 is charged to an appropriate predetermined pressure, this pressure is detected by the transducer 22 which emits a signal to the control unit 19 causing the valve 21 to open so that the output from the pump 16 is directed by way of conduit 20 to the reservoir 7. With the system in this condition it will be apparent that there is negligible load on the pumps 6 and 16 and, if required, the control unit 19 can be arranged to switch off the motor 18 until fluid pressure is required for power assisted steering or to charge the accumulator—either simultaneously or individually. With a typical hydraulic system the pumps 6 and 16 are likely to have different output flow rates with the output flow rate of the pump 6 for power steering being greater than that of the rate for the pump 16 to charge the accumulator; for example the pump 6 may be rated at 3 liters per minute and the pump 16 at 1 liter per minute.

During use of the booster device 10 the pressure in the accumulator 13 will fall below the required predetermined value; this is sensed by the transducer 22 which imparts a signal to the control unit 19 causing the by-pass valve to close communication between the conduit 20. The whole output from the pump 16 is now directed to charge the accumulator 13 until the predetermined accumulator pressure is attained. As the accumulator is being charged it may be that the vehicle is not subjected to a steering manoeuvre so that the output from the pump 6 merely circulates unrestrictedly through the system part 5. When a steering manoeuvre is effected, the valve 4 directs hydraulic fluid to the servo device 3 as appropriate to assist that manoeuvre and consequently the pump 6 will be subjected to a load which increases as does the power required for the motor 18—particularly if the steering manoeuvre is effected simultaneously with the accumulator being charged so that both pumps may be required to supply considerable power and the load on the motor 18 and the electrical power drain may become excessive. To alleviate this possibility the pressure regulating valve 23 is provided in the system part 5. This valve 23 is responsive to the output pressure from the pump 16 and effectively determines (either progressively or otherwise) the maximum pressure which is available from the pump 6 for operating the power assistance servo device 3 when the pressure which is being applied to charge the accumulator 13 attains a predetermined value. As the accumulator 13 is being charged with the by-pass valve 21 closed, hydraulic pressure developed in conduits 14 and 28 from the pump 16 will increase. This latter pressure acts in the chamber 27 of the regulating valve 2 and, when it attains a predetermined value, it causes the chamber 27 to expand and displace the spool 25 rightwardly in FIG. 2 against the spring biasing 29. Such displacement of the spool 25 will relieve the load on the ball member 30; however the ball member 30 may still be retained in its seating 31 to close the conduit 24 by pressure from the biasing spring 32. With the regulating valve 23 in this latter condition it will be apparent that the maximum pressure which can be developed in the conduit 8 will be determined by the extent to which the spool 25 has been displaced and the strength of the spring 32. Consequently, if a steering manoeuvre is effected while the accumulator 13 is being charged, the pressure in the conduit 8 from the output of pump 6 may progressively increase to assist in the steering manoeuvre to an extent until that pressure is sufficient to react on the ball member 30 through conduit 24 and cause the ball member to lift from its seating 31 and open the conduit 24 (so that part of the output from the pump 6 passes by way of the conduit 24 to conduit 9 and thereby to the reservoir). In this way the load on the motor 18 which is attributable to driving the pump 6 is restricted. The present proposal may be favourably compared with conventional hydraulic systems where both the power assisted steering system part and the brake or clutch system part are pressurised from a single pump so that the load to which that single pump is subjected is determined by the maximum load required by either system part. It is believed, for example, that if while charging the accumulator 13 the regulating valve 23 is arranged to open the conduit 24 at 200 pounds per square inch, the load on the motor 18 need only be approximately 25% of the power required in a conventional single pump system; if the regulating valve 23 is arranged to open the conduit 24 when the pressure in the system part 5 is 400 pounds per square inch, then the load on the motor 18 need only be in the order of 30% of the load to which a single pump would be subjected in the conventional system. It will thus be appreciated that the present proposal can provide considerable savings in the energy required by the pump motor. It is believed that the occasions when it would be desirable for both pumps 6 and 16 to deliver high pressure to their respective system parts at the same time are likely to be rare so that the proposed system is unlikely to impose unacceptable restrictions.

It is accepted practice that power assistance which is available for a steering manoeuvre should be greater when the vehicle is at low speed (for example to assist in parking manoeuvres) than when the vehicle is at high speed. With this in mind it is preferred that the motor 18 is responsive to vehicle speed in an inverse relationship so that as the vehicle speed increases the motor drives the pumps 6 and 16 to decease the output therefrom. To achieve this the system can include a vehicle speed sensor device 33 that provides an input to the control unit 19 from which the unit 19 can appropriately regulate the drive provided by the motor 18.

I claim:

1. A vehicle control system having a first hydraulic system part comprising a first pump the output from which feeds an open center valve which valve controls operation of a first servo device, a second hydraulic system part comprising a second pump the output from which feeds an accumulator and a closed center valve which is fed from said accumulator and controls operation of a second servo device, a motor for simultaneously driving both said first and second pumps, and pressure control means which is responsive to pressure in the accumulator and which means directs at least part of the output from the second pump to a low pressure sink when said pressure attains a predetermined value to relieve the load on the motor which is attributable to it driving the second pump, the first hydraulic system part including regulating means which is responsive to pressure from the output of the second pump and which regulating means permits at least part of the output from the first pump to flow to the low pressure sink when the pressure of the output from the second pump attains a predetermined value so that the pressure which is available to the open center valve is less than the maximum pressure available from the output of the first pump and the load on the motor which is attributable to it driving the first pump is relieved.

2. A system as claimed in claim 1 in which the regulating means is responsive to pressure from the output of the second pump to progressively increase the proportion of the output from the first pump which is permitted to flow to the sink as the pressure of the output from the second pump progressively increases from said predetermined value.

3. A system as claimed in claim 1 in which the regulating means comprises a regulating valve having an expandable chamber which is subjected to fluid pressure from the output of the second pump and is expandable when said output attains the predetermined value to relieve passage closure means through which the output from the first pump can flow to the sink when that output exceeds a predetermined pressure which is less than the maximum pressure available from the first pump.

4. A system as claimed in claim 3 in which the passage closure means comprises a member which is biased to normally close communication between the output from the first pump and the sink and is displaced against its biasing to open said communication when the output from the first pump exceeds said predetermined pressure.

5. A system as claimed in claim 4 in which the expandable chamber is partly defined by a spool which is biased by first means in a sense to contract said chamber and to urge the closure member in one direction to close communication between the output from the first pump and the sink; the closure member is biased by second means relative to said spool to be urged in said one direction, and wherein when the said chamber is expanded, the closure member is relieved of pressure from the first biasing means so that when the output from the first pump exceeds said predetermined pressure, the closure member can be displaced in the opposite direction solely against the second biasing means and relative to the spool to open communication between the output from the first pump and the sink.

6. A system as claimed in claim 1 in which the first and second pumps have different output flow rates.

7. A system as claimed in claim 6 in which the output flow rate of the first pump is greater than that of the second pump.

8. A system as claimed in claim 1 in which the motor is responsive to vehicle speed in an inverse relationship so that as the vehicle speed increases the motor drives the first and second pumps to decrease the output therefrom.

9. A system as claimed in claim 8 in which the motor is electric and control means therefor is provided which control means includes a vehicle speed sensor providing a signal from which the drive provided by the motor is determined.

10. A vehicle control system having a first hydraulic system part comprising a first pump the output from which feeds an open center valve which valve controls operation of a first servo device, a second hydraulic system part comprising a second pump the output from which feeds an accumulator and a closed center valve which is fed from said accumulator and controls operation of a second servo device, a motor for simultaneously driving both said first and second pumps, and pressure control means which is responsive to pressure in the accumulator and which means directs at least part of the output from the second pump to a low pressure sink when said pressure attains a predetermined value to relieve the load on the motor which is attributable to it driving the second pump, the Pressure control means comprising an open/closed valve which is controlled in response to the pressure in the accumulator attaining said predetermined value to direct the whole output from the second pump to the sink.

11. A system as claimed in claim 10 in which the motor is electric.

12. A vehicle control system having a first hydraulic system part comprising a first pump the output from which feeds an open center valve which valve controls operation of a first servo device, a second hydraulic system part comprising a second pump the output from which feeds an accumulator and a closed center valve which is fed from said accumulator and controls operation of a second servo device, a motor for simultaneously driving both said first and second pumps, and pressure control means which is responsive to pressure in the accumulator and which means directs at least part of the output from the second pump to a low pressure sink when said pressure attains a predetermined value to relieve the load on the motor which is attributable to it driving the second pump, the pressure control means being electrically controlled by a unit which determines the operation of said pressure control means in response to signals received from a pressure transducer which is responsive to pressure in the accumulator.

13. A vehicle control system having a first hydraulic system part comprising a first pump the output from which feeds an open center valve which valve controls operation of a first servo device, a second hydraulic system part comprising a second pump the output from which feeds an accumulator and a closed center valve which is fed from said accumulator and controls operation of a second servo device, a motor for simultaneously driving both said first and second pumps, and pressure control means which is responsive to pressure in the accumulator and which means directs at least part of the output from the second pump to a low pressure sink when said pressure attains a predetermined value to relieve the load on the motor which is attributable to it driving the second pump, said motor being an electric motor, said system further including control means for switching the electric motor on or off depending upon the demand for hydraulic pressure in either or both the first and second system parts.

14. A vehicle control system having a first hydraulic system part comprising a first pump the output from which feeds an open center valve which valve controls operation of a first servo device, a second hydraulic system part comprising a second pump the output from which feeds an accumulator and a closed center valve which is fed from said accumulator and controls operation of a second servo device, a motor for simultaneously driving both said first and second pumps, and pressure control means which is responsive to pressure in the accumulator and which means directs at least part of the output from the second pump to a low pressure sink when said pressure attains a predetermined value to relieve the load on the motor which is attributable to it driving the second pump, the first servo device providing power assistance for vehicle steering and the second servo device providing a brake or clutch booster.

* * * * *